UNITED STATES PATENT OFFICE.

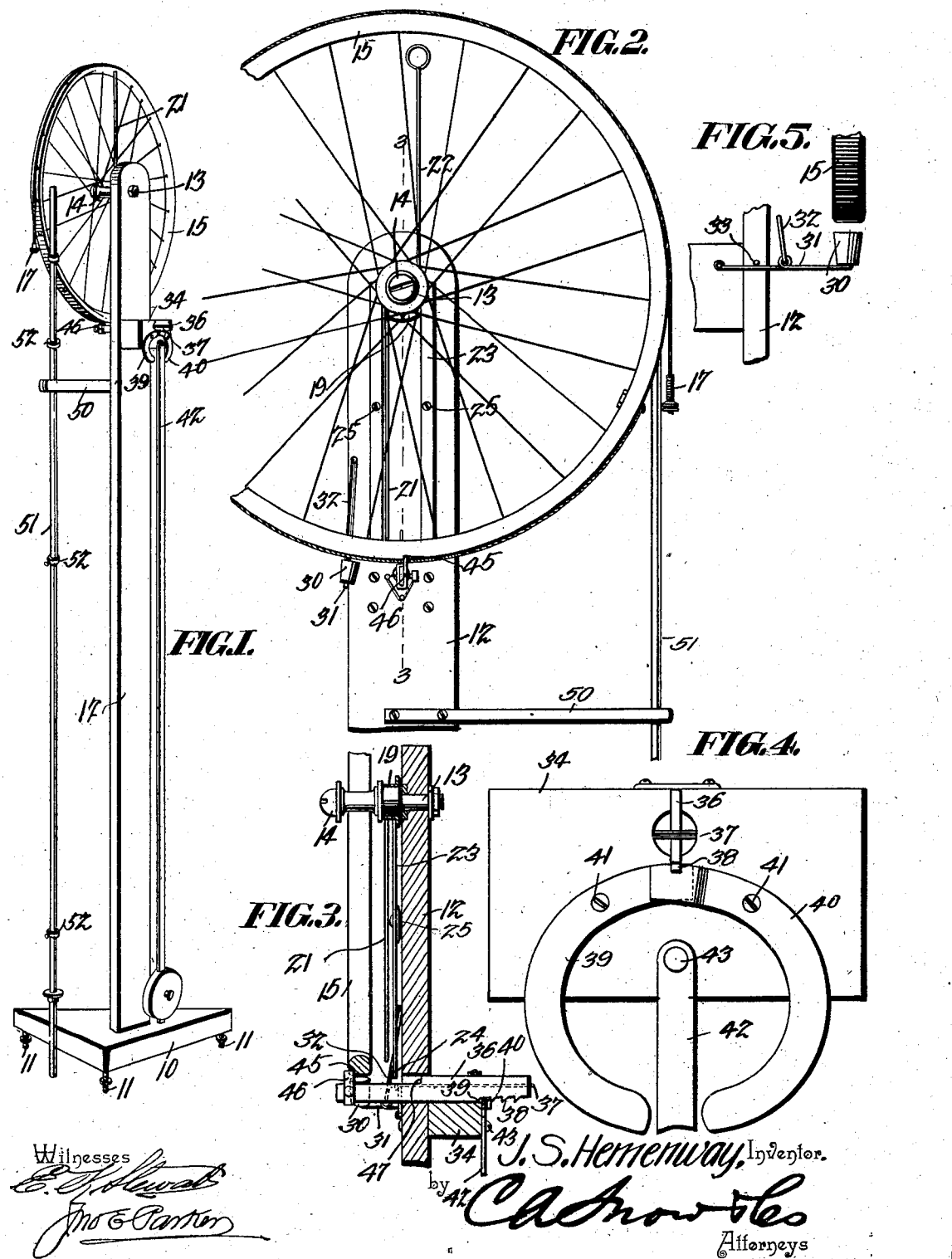

JUSTIN SAMUEL HEMENWAY, OF RIVER FALLS, WISCONSIN.

APPARATUS FOR DEMONSTRATING THE LAWS OF GRAVITY.

SPECIFICATION forming part of Letters Patent No. 720,426, dated February 10, 1903.

Application filed March 1, 1902. Serial No. 96,287. (No model.)

*To all whom it may concern:*

Be it known that I, JUSTIN SAMUEL HEMENWAY, a citizen of the United States, residing at River Falls, in the county of Pierce and State of Wisconsin, have invented a new and useful Apparatus for Demonstrating the Laws of Gravity, of which the following is a specification.

My invention relates to certain improvements in apparatus for accurately measuring the distance through which a body will fall during a predetermined interval of time and the velocity acquired by a falling body at the end of any period of time.

The object of the present invention is to improve, simplify, and render more certain and accurate the mechanism or apparatus forming the subject of Letters Patent No. 531,935, granted to me on January 1, 1895.

A further object of the invention is to so construct the apparatus that the starting and stopping operations may be accomplished more certainly and accurately than in the apparatus forming the subject of the Letters Patent referred to and in which the stopping operation is automatically effected by the movement of the pendulum without shock or jar, the main wheel, which is rotated by the weight or force, being allowed to continue its movement, while the automatic mechanism merely stops a lightly-balanced pointer or indicating device.

A still further object of the invention is to render the device adjustable in order that any predetermined equal time periods may intervene between the starting and stopping operations; and a still further object is to render the machine or apparatus more accurate in its operation by the reduction of friction and by connecting the unbalanced force at such points as will enable its leverage to be exerted to greater advantage by the employment of a delicately-balanced wheel of comparatively large diameter, to the periphery of which the weight or unbalanced force is applied in lieu of the comparatively small winding-cylinder heretofore employed.

With these and other objects in view the invention consists in the novel construction and combination of parts hereinafter described, illustrated in the accompanying drawings, and particularly pointed out in the appended claims.

In the drawings, Figure 1 is a perspective view of a gravity apparatus constructed in accordance with my invention. Fig. 2 is an elevation of a portion of the same. Fig. 3 is a transverse sectional elevation of the apparatus on the line 3 3 of Fig. 2. Fig. 4 is a front elevation of a portion of the apparatus shown in Fig. 1, drawn to an enlarged scale. Fig. 5 is a view of a detail of construction.

Similar numerals of reference are employed to designate corresponding parts throughout the several figures of the drawings.

The various parts of the mechanism are supported by a base 10, mounted on a series of adjusting-screws 11, so that the machine may be readily leveled. From the base rises a standard 12, provided at a point near its upper end with a fixed stud 13, on which is delicately mounted, as by ball-bearings, a wheel-hub 14, carrying a skeleton wheel 15, the periphery of which is substantially flat or may be slightly concaved for the reception of a flexible cord or the like, one end of which is secured to the periphery of the wheel and the opposite end provided with a weight or weight-attaching device 17, the length of the cord being preferably about equal to the circumference of the wheel, this distance being about equal to the height of the wheel from the base. The hub 14 is made of sufficient length to enter a flanged collar 19, which is arranged loosely on said hub and is free for longitudinal movement thereon, the relative diameters of the hub and the collar being such that under normal conditions the collar will be revolved with said hub. The flanged collar carries a light pointer 21, extending therefrom in a radial line to a point opposite the periphery of the wheel, so that it may be adjusted into alinement with any desired designating-mark on such periphery, and in order to prevent any independent movement of such indicator or pointer a counterbalance 22 is carried by the collar at a point diametrically opposite the said pointer.

On that side of the standard 12 on which the wheel is disposed are arranged a pair of brake-levers 23, connected at their lower ends by a cross-bar 24, said levers being loosely fulcrumed at an intermediate point on screws or studs 25 and at their upper ends are adapted for contact with the annular flange of the collar 19. During the operation of the pointer therewith the brake-levers are out of contact with the sleeve or in such loose contact therewith as not to impede the movement of the sleeve; but when the pointer is to be stopped after any predetermined period of time the upper ends of said brake-levers are forced firmly against the annular flange, moving the collar against the face of the standard or a suitable friction-plate thereon, instantly stopping the pointer, while permitting further and free movement of the heavier wheel under the influence of the unbalanced force 17. The wheel may be stopped at any time by hand or its speed may be gradually checked by the operation of a brake block or shoe 30, carried by a pivoted lever 31, which may be moved in the direction of the wheel by an elastic band or spring 32, a stop-pin 33 being provided for normally holding the lever and brake-shoe in inoperative position.

On that side of the standard opposite the wheel is secured a block 34, through which and through the standard is formed a guiding-slot for the reception of a sliding bar 36, which normally is forced in the direction of the wheel by a suitable elastic band or light metal spring 37. On the under side of the bar are formed a number of teeth 38, each representing an interval of time, the number of teeth being increased or decreased in accordance with the size and capacity of the apparatus. The teeth are separated for a distance sufficient to permit of the entrance therebetween of a pair of overlapping pawls 39 and 40, which are pivoted on screws 41 at a point near their upper ends, said pawls being substantially semicircular in form and their centers of gravity being such as will tend to cause their lower ends to approach each other. The inner or rear faces of the pawls are inclined at the same angle as the inclined face of the teeth 38, as shown in Fig. 3. The lower ends of the pawls are disposed in the same plane with a pendulum 42, pivoted on a stud 43 carried by the block 34, the lower end of the pendulum being provided with an adjustable bob which may be raised or lowered to decrease or increase the length of time of vibration, such pendulum, when set into motion, acting alternately on the pawls to effect their release from the teeth 38, the bar 36 receiving a step-by-step movement in the direction of the wheel under the influence of the elastic band or spring 37.

At a certain point in the periphery of the wheel 15, determined by the point of attachment of the flexible cord, is a small notch or recess 45 for the reception of a catch 46, adjustably secured to the sliding bar 36, so that after forcing the bar inwardly past the pawl to the extent of one or more teeth, in accordance with the desired number of periods of time for which the apparatus is to be operated, said catch may be moved into locking engagement with said notch or recess and hold the wheel from rotation under the influence of the unbalanced force represented by the weight 17. The catch 46 is adjustable on the sliding bar 36 and is held in any position to which it may be adjusted by means of a suitable set-screw or other securing device. This permits of the adjustment of the sliding bar 36 for an operation of the machine extending over any desired period of time, the catch being adjusted to position in the notch or recess 45 after the sliding bar has been moved to the desired position. The bar has a shoulder 47, which when the bar is freed from contact with the pawls by the vibration of the pendulum will come into contact with the cross-bar 24 of the brake-levers, forcing the upper ends of the latter into contact with the annular flange of the pointer-carrying sleeve and stopping such pointer immediately.

From one side of the standard projects a clip 50, adapted to support a vertically-disposed measuring-rod 51, provided with adjustable collars 52, which may be placed at suitable intervals on the rod to designate the spaces through which a body will fall during successive equal periods of time, the space between the first and the second collars at the upper end of the rod representing the distance through which a body will fall in a vacuum during a period of one second, this period being represented by one vibration of the pendulum, and the distance representing sixteen feet, being the distance which a body will travel in a vacuum during the first second of time. The third collar is placed at a distance representing the distance which a body will travel during the second period of time, the greater distance being due to the well-known laws of gravity.

In the operation of the apparatus the sliding bar 36 is forced inwardly past the pawls for a number of teeth equal to the number of periods of time for which the apparatus is to be operated, the wheel being rotated until the cord is wound upon its periphery and the weight 17 is in line with the uppermost of the collars 52 on the rod. The catch 46 is then inserted in the recess or notch in the periphery of the wheel, and the pointer 21 is moved opposite any predetermined point or designating-mark on the periphery of the wheel. The device is now ready for operation, and the pendulum-rod is swung on its pivot until the upper portion of the rod is in engagement with the first pawl. The pendulum is then released and at the end of its movement comes into contact with the opposite pawl, moving the latter to releasing position and permitting the bar 36 to move inwardly, releasing the catch 46 from the locking-notch and allowing the wheel, together with the pointer, to rotate under the influence of the weight, the wheel continuing to rotate until the pendulum-rod by successive contact with alternate pawls has permitted the last tooth on the bar to pass the pawls, the last movement of the bar causing its shoulder to engage the cross-bar 24 of the brake-rod and effecting the stoppage of the pointer-carrying collar, while the wheel still continues to rotate. The movement of the wheel is then arrested by hand or by the application of the brake-shoe 30 and is turned back until the designating-mark is again opposite the pointer, the distance traveled being readily ascertained.

The device is found to be exceedingly accurate in its operation, the pointer and wheel being released and permitted to travel through one or more periods of time, each representing one vibration of the pendulum, and the instant stoppage of the pointer effected at the end of any period for which the apparatus has been primarily adjusted. As the pointer is comparatively light and acquires little or no momentum, its movement may be arrested much quicker than that of the wheel and without the shock and jar incident to the stoppage of the heavier and delicately-balanced wheel.

Numerous experiments may be carried on with the apparatus, and various modifications in the nature of the measuring devices, as well as in the details of construction and in the proportion of the parts, may be made without departing from the spirit or sacrificing any of the advantages of my invention.

Having thus described my invention, what I claim is—

1. In an apparatus of the class described, a revoluble wheel, a pointer adapted to travel therewith, and means for stopping the movement of the pointer at the end of a predetermined period of time.

2. In an apparatus of the class described, a wheel revoluble under the influence of an unbalanced force, a pointer adapted to travel with said wheel, means for locking and releasing the wheel and pointer, and means for stopping the pointer at the end of a predetermined period of time.

3. In an apparatus of the class described, a wheel revoluble under the influence of an unbalanced force, a hand or pointer movable with said wheel, a pendulum, and mechanism operable by the pendulum for releasing the wheel and pointer and for stopping the movement of the pointer at the end of a predetermined period of time.

4. In an apparatus of the class described, a wheel revoluble under the influence of an unbalanced force, a pointer movable with the wheel, mechanism adapted to lock and release the wheel and to check the movement of the pointer, and a pendulum controlling the movement of such mechanism.

5. In an apparatus of the class described, a revoluble wheel, a hand or pointer, a bar adapted to lock the wheel, to release the same and to stop the movement of the pointer, and a pendulum controlling the movement of said bar.

6. In an apparatus of the class described, a wheel revoluble under the influence of an unbalanced force, a bar adapted to lock and to release the wheel, detent-teeth disposed on the bar, pawls engaging said teeth, and a pendulum adapted to operate said pawls.

7. In an apparatus of the class described, a wheel revoluble under the influence of an unbalanced force, a pendulum, and an adjustable locking and releasing mechanism engaging the wheel and under the control of the pendulum.

8. In an apparatus of the class described, a wheel revoluble under the influence of an unbalanced force, a hand or pointer adapted to travel therewith, an adjustable mechanism for stopping the pointer at the end of a predetermined period of time, and a pendulum controlling the movement of said mechanism.

9. In an apparatus of the class described, a wheel revoluble under the influence of an unbalanced force, a toothed bar engaging said wheel, a pair of oppositely-disposed locking-pawls engaging said bar, a pendulum adapted to effect a releasing movement of the pawls at the end of each vibration, and means for determining the degree of movement of the wheel at the end of a predetermined period of time.

10. In an apparatus of the class described, a wheel revoluble under the influence of an unbalanced force, a hand or pointer adapted to travel therewith, a toothed bar, a catch adjustably secured to said bar and adapted to engage the wheel, mechanism operable by the bar for stopping the travel of the pointer at the end of a predetermined period of time, a pair of oppositely-disposed pawls adapted to engage said toothed bar, and a pendulum adapted to effect a releasing movement of the pawls at the end of each vibration.

11. In an apparatus of the class described, a standard, a stud-shaft carried thereby, a wheel mounted on said stud-shaft, a weighted cord carried by the wheel, a flanged collar disposed on the hub of the wheel, a counterbalanced pointer adapted to engage the collar, a toothed bar, a spring for operating the same, a catch adjustably secured to said bar and adapted to engage the wheel, a pair of locking-pawls engaging said toothed bar, a pendulum adapted to effect a releasing movement of the pawls, a brake-lever, and a vertical rod having adjustable collars for indicating the degree of descending movement of the weight on said cord.

In testimony that I claim the foregoing as my own I have hereto affixed my signature in the presence of two witnesses.

JUSTIN SAMUEL HEMENWAY.

Witnesses:
WARREN P. KNOWLES,
JOHN B. ADAMS.